Patented Aug. 17, 1943

2,327,131

UNITED STATES PATENT OFFICE 2,327,131

POLYAMIDE

Paul L. Salzberg, Wilmington, Del., assignor to E. I du Pont de Nemours & Company, Wilmington, Del., a corporation of Delaware No Drawing. Application April 1, 1940, Serial No. 327,322

13 Claims. (Cl. 260—78)

This invention relates to polymeric products and more particularly to a new class of polyamides.

The polyamides with which this invention are concerned are of the general type described in United States Patents 2,071,250, 2,071,253, and 2,130,948, and are obtained by polymerizing a mixture of diamine and dibasic acid, or by the self-polymerization of an amino acid. These polyamides when prepared from the above mentioned reactants containing only the functional amino and carboxyl groups are for the most part quite insoluble in ordinary organic solvents at low temperatures. These polyamides are, furthermore, not readily susceptible to further chemical modifications. As a means for overcoming these disadvantages it has been proposed heretofore to introduce into the polyamide a laterally substituted ether or hydroxyl-containing substituent in the polymer chain by using polyamide-forming compositions including at least one polyamide reactant containing such substituent. Although the polyamides obtained are in general more soluble in ordinary solvents, and are susceptible to further minor chemical modifications, further improvement in these characteristics is desirable. In addition to the fact that the above mentioned laterally substituted reactants are difficultly accessible, their use is further disadvantageous because in the case of laterally substituted dibasic acids fiber-forming polyamides could not be obtained readily from short chain acids, that is, from laterally substituted dibasic acids, or their amide-forming derivatives, containing as few as two contiguous carbon atoms interdisposed between the carboxyl groups.

This invention has as an object the preparation of polyamides having increased solubility in ordinary organic solvents. A further object is the production of polyamides capable of a higher degree of chemical modification than the polyamides previously prepared. A further object is the preparation from short chain dibasic acids of polyamides capable of being readily formed into fibers and films. Other objects will appear hereinafter.

These objects are accomplished by polymerizing a polyamide-forming composition comprising at least one polyamide-forming reactant containing a lateral acetal bridge. The polyamide-forming composition may consist of an amino acid as the sole polyamide-forming reactant, or of a mixture of diamine and dicarboxylic acid or of a mixture containing one or more of all three of these types of reactants. At least one reactant in any of these instances contains a lateral acetal bridge. It is to be understood that instead of the dicarboxylic and amino acids there can be used the equivalent amide-forming derivatives such as the esters, acid halides, amides, anhydrides, and nitriles.

The expression "lateral acetal bridge" whenever used in the specification and claims signifies an acetal structure in which the two non-aldehydic carbon atoms linked to the acetal oxygens are themselves linked together and form part of the polyamide chain; these two carbon atoms, the two acetal oxygens and the third (aldehydic carbon atom form a ring, from which both ends of the polyamide chain project laterally. This configuration may be represented graphically by the following formula:

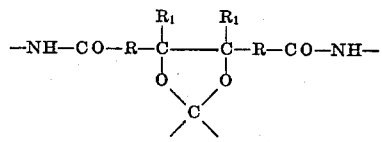

wherein R, when present, is a divalent hydrocarbon radical, $R_1$ is hydrogen or a hydrocarbon radical, and the indicated valences are satisfied by substituents selected from the class consisting of hydrogen and hydrocarbon radicals. For convenience, the term acetal as used herein also includes the ketals which differ from the acetals only in that neither of the last mentioned substituents is hydrogen.

The lateral acetal bridges discussed above can, alternatively, be called 1,3-dioxolane bridges.

The structures of this invention are not to be confused with other polyamide structures containing acetal linkages. For example, it is possible to write formulae such as

—NH—CO—R—O—CH—O—R—CO—NH—
               |
               R' or

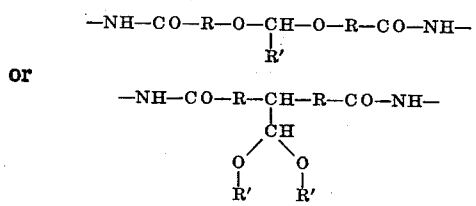

which are both polyamides containing acetal linkages. Neither of these structures answer the definitions given above and neither form part of this invention.

In the generic formula given above for the polyamides of this invention the radical R can be omitted in which case the formula becomes polyamides of this invention the radicals R can

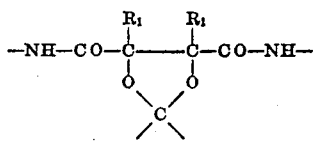

Such are, for example, the polyamides derived from acetals of tartaric acid.

In the case of the preferred polyamides, those of the diamine-dibasic acid type, the lateral acetal bridge is conveniently introduced into the polyamide by a dibasic acid which contains the lateral acetal bridge and which is of the formula

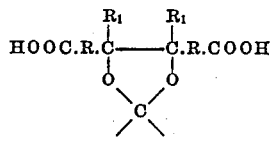

wherein R represents a divalent organic radical or is non-existent, $R_1$ hydrogen or a hydrocarbon radical, and wherein the indicated valences are satisfied by substituents selected from the class consisting of hydrogen and hydrocarbon radicals. For convenience the term "acetal" as used herein also includes the ketals which differ from the acetals only in that neither of the last mentioned substituents is hydrogen.

An acid of the above kind is the acetal of tartaric acid which is of the formula

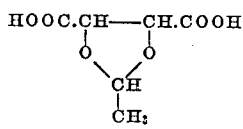

In the general formula above the substituents satisfying the indicated valences may form part of a closed chain, as for instance in the case of a cyclohexanone ketal in which the bridge is of the form

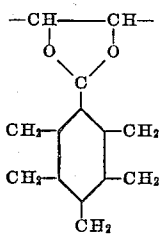

The products of this invention are linear polyamides capable of being drawn into filaments showing orientation along the fiber axis. Chemically, they contain a plurality of lateral acetal bridges, as defined above, regularly interdisposed between the carbonamido groups. This invention also includes, and is generic to, interpolyamides formed by polymerizing together a plurality of polyamide-forming constituents at least one of which contains a lateral acetal bridge.

The polyamides of this invention containing lateral acetal bridges are obtained by heating the previously described polyamide-forming compositions at temperatures below 300° C.

Among the compounds containing lateral acetal bridges which may be used for this reaction and which are readily available are the ketals of tartaric and mucic esters. These esters are condensed with a diamine, such as hexamethylenediamine or m-phenylenediamine, in the presence or absence of other polyamide-forming reactants, by the methods described below. The properties of the polymers obtained by the condensation polymerization depend largely on the degree of polymerization, which in turn is dependent on the reactivity and thermal stability of the polyamide-forming ingredients.

Polyamides containing lateral acetal bridges are conveniently prepared in a reaction vessel having at least one opening, and which has a volume of about four times the total amount of reactants. Since molten polyamides are susceptible to oxidation, it is desirable to provide a blanket of an inert gas, such as purified, deoxidized nitrogen. For convenience, the reaction vessel is equipped in such a way that it can be alternately evacuated and flushed with the inert gas. Substantially chemically equivalent quantities of the polyamide-forming reactants are introduced into the reaction vessel and mixed thoroughly. Since a preliminary reaction often takes place at room temperature, it is sometimes desirable but not essential to allow the reactants to remain at room temperature for a period of 10–20 hours. Since low molecular weight diamines are often volatile with the products of this amide-forming reaction, this preliminary reaction at a low temperature effectively prevents loss of the diamines during subsequent heating.

After this preliminary reaction has taken place, the reaction mixture will have become quite viscous or perhaps even solid. The reaction flask is then flushed thoroughly with the inert gas to displace all air. The reaction mixture is heated, preferably by means of a vapor bath to avoid local super-heating, to a temperature sufficiently high to promote removal of the volatile products of the reaction. This temperature is usually between 100° and 150° C. After 2–10 hours, when removal of the volatile products of the amide-forming reaction is substantially complete, the reaction temperature can be raised about 25° C. After a short time at this temperature, a slight vacuum is applied to the reaction vessel, whose openings are carefully sealed against the admission of air. The application of a vacuum may cause an immediate bubbling as more of the volatile reaction product is removed by distillation, and if care is not taken at this time, there is the possibility that the viscous polymer will foam up into the outlet and effectively seal it. The vacuum is gradually increased until there is an absolute pressure of about 10 mm. on the reaction mixture. This slow evacuation sometimes requires an hour. If experience has shown that the polymer obtained at this point has a viscosity lower than that desired, heating under vacuum at a slightly higher temperature can be continued until the degree of polymerization desired is reached.

The degree of polymerization attained can be judged conveniently by solution- or melt-viscosity measurements. In the case of the acetals and ketals of tartaric acid, the degree of polymerization is often indicated by the intensity of the color or of the reaction mixture. Polymers possessing superior superpolymeric properties are usually obtained when the color varies between ruby red and garnet red. The best polymers obtained from ketals of mucic acid have an amber color. Colors deeper than those just related are often indicative of excessive decomposition of the polymer. Accordingly, any temperature sufficiently high to cause the rapid formation of this color is to be avoided. When the desired degree of polymerization has been reached, the reaction mixture is allowed to cool under the blanket of an inert gas. Since the polyamide sets up to a solid block, the reaction vessel must be opened in order to obtain it. However, by use of a suitable apparatus, it is possible to extrude the molten polymer in the form of a foil or fiber, in an inert atmosphere, so that the same reaction vessel can be used repeatedly.

In certain cases, for example, in the reaction between an acetal dibasic acid and a diamine, the high temperatures necessary for amide formation, and the water which is distilled from the reaction mixture cause losses of quantities of diamine sufficient to prevent a high degree of polymerization. Under these circumstances, it is necessary to heat the reaction mixture in a closed vessel to prevent loss of the diamine before a substantial degree of polymerization has been attained. Temperatures of 150–200° C. are often used when the reaction is carried out under pressure. At the end of one or two hours' heating in a closed system, it is permissible to begin the slow removal of the volatile reaction products. When the pressure has reached atmospheric, the polymerization is completed as described above.

The acetals and ketals mentioned in the examples below are made by methods recorded in the literature, for example, in Berichte 71, 1803 (1938). The diamines may be prepared as described in United States Patents 2,166,150, 2,166,151 and 2,166,152.

The following examples, in which the parts are by weight, the temperature in degrees centigrade, and intrinsic viscosity determined in m-cresol, are illustrative of the practice of my invention.

*Example I*

To 2.1673 parts of hexamethylenediamine in a tubular vessel open at one end is added 6.389 parts of the cyclohexanone ketal of dibutyl tartrate. The vessel is flushed thoroughly with deoxidized nitrogen and sealed off under an absolute pressure of 2 mm. The mixture is heated at 200° for two hours. The reaction vessel is cooled and nitrogen is admitted until the pressure is atmospheric. The material is heated in a bath of naphthalene vapor at 218° for two hours at atmospheric pressure, and finally at 15 mm. pressure for one-half hour at 218°. The material changes gradually to a ruby red color during the last heating period. On cooling it sets to a clear, glassy resin which can be spun to long fibers showing ability to be oriented by cold-drawing as indicated by the marked birefringence observed in polarized light. The polymer has a softening range of 85° to 130° and an intrinsic viscosity, as defined in Patent 2,130,948, of 0.26. Transparent films can be cast from its methanol solution. The polyamide thus prepared can be called polyhexamethylenetartramide cyclohexanone ketal. It is soluble in phenol, formic acid and ethanol. It is insoluble in acetone, benzene and ligroin.

*Example II*

To 2.418 parts of hexamethylenediamine is added 4.542 parts of the acetone ketal of dimethyl tartrate. The ingredients are mixed thoroughly by shaking and allowed to stand at room temperature for 72 hours. The tubular vessel is flushed with nitrogen and heated in a bath of boiling butanol (118°) for two hours at atmospheric pressure and for 16 hours at 1 mm. absolute pressure. It is then heated at 218° for one-half hour at 1 mm. At the end of this time the color becomes a garnet red. The polyhexamethylene-tartramide acetone ketal thus obtained has particularly valuable fiber-forming properties, is easily spun into filaments which can be cold-drawn into fibers showing by X-ray examination orientation along the fiber axis. Its softening range is 137–148° and its intrinsic viscosity is 0.62. It is soluble in the lower aliphatic alcohols, from which it can be cast into clear, tough films.

*Example III*

To 3.168 parts of decamethylenediamine in a tubular vessel open at one end is added 4.27 parts of the acetaldehyde acetal of diethyl tartrate. The ingredients are mixed thoroughly and allowed to stand for several days. The tube is flushed with nitrogen and heated at 140° at atmospheric pressure for one-half hour, at 140° at 5 mm. absolute pressure for one hour, and at 218° at 5 mm. absolute pressure for one-half hour. During this period the polymer darkens from an amber to a reddish-brown color. The polymer can be spun and cold drawn readily. It is soluble in methanol, ethanol and phenol, and films can be cast from these solutions. It has a softening range of 100–107° and an intrinsic viscosity of 0.59. It can be called polydecamethylenetartramide acetal.

*Example IV*

A thorough mixture is made of 7.05 parts of triglycoldiamine and 12.38 parts of diethyl tartrate methyl ethyl ketal and the mixture is allowed to stand over night. The reaction vessel is flushed with nitrogen and heated at 140° at atmospheric pressure for two hours, at 140° at 40 mm. absolute pressure for 1.5 hours, and at 218° at 5 mm. absolute pressure for one hour. The polytriglycoltartramide methyl ethyl ketal is a brown, fluorescent resinous polymer, somewhat viscous at room temperature. It is quite easily soluble in water.

*Example V*

In a tubular vessel there is placed an intimate mixture of 3.65 parts of meta-phenylenediamine and 7.37 parts of diethyl methylene tartrate, and the mixture is allowed to stand over night. The vessel is flushed with nitrogen and heated at atmospheric pressure at 140° for two hours, at 218° for one hour, and finally at 218° at 2 mm. absolute pressure for one hour. The polymetaphenylene-methylenetartramide so prepared is colored a deep red and easily spinnable into long filaments. It softens from 168° to 176° and is soluble in phenol.

*Example VI*

To 2.49 parts of hexamethylenediamine in a tubular vessel is added 9.14 parts of the bis-cyclohexanone ketal of diethyl mucate. The ingredients are mixed thoroughly by warming and allowed to stand over night. The tube is flushed with nitrogen and heated successively at 140° at atmospheric pressure for one hour, at 140° at 2 mm. for two hours, at 180° at 2 mm. for three hours, at 218° at 2 mm. for two hours, and at 278° at 2 mm. for two hours. The polymer at this time has attained an amber color. It is easily spun and cold-drawn. It melts at 143–151° and has an intrinsic viscosity of 0.41. It is soluble in methanol but not in acetone. Films can be cast from its solution in methanol. This polymer contains two lateral acetal bridges on each structural unit of the chain. It may be called polyhexamethylenemucamide bis-cyclohexanone ketal.

Example VII

To 4.25 parts of hexamethylenediamine in a tubular vessel open at one end is added 3.19 parts of methyl adipate and 3.99 parts of the acetone ketal of dimethyl tartrate. The ingredients are mixed thoroughly and allowed to stand overnight. The vessel is flushed thoroughly with nitrogen and sealed off at an absolute pressure of 2 mm. After heating at 160° for three hours, it is refilled with nitrogen. It is heated at 200° at atmospheric pressure for one hour and at 200° at 2 mm. absolute pressure for one and one-half hours. The interpolyamide of hexamethyleneadipamide and hexamethylenetartramide acetone ketal thus obtained is orange-red and transparent. It can be spun and cold-drawn. It softens at 155–170°, has an intrinsic viscosity of 0.35 and is soluble in phenol.

Example VIII

To prepare an interpolyamide comprising 75% of hexamethyleneadipamide and 25% of hexamethylenetartramide acetone ketal, there are added to a tubular vessel 1.58 parts of hexamethylenediamine, 2.97 parts of dimethyl tartrate acetone ketal, and 10.7 parts of hexamethylenediammonium adipate. The vessel is flushed thoroughly with nitrogen and sealed off at an absolute pressure of 2 mm. The tube is heated at 225° for 1.5 hours, cooled, and refilled with nitrogen. It is heated at 280° for 20 minutes without evacuation. The resulting interpolyamide is colored red-brown, melts at 228–242° and has an intrinsic viscosity of 0.76. It can be spun and cold-drawn to strong fibers. It is soluble in phenolic solvents and formic acid.

Example IX

Six-tenths part of hexamethylenediamine, 2.22 parts of the bis-cyclohexanone ketal of diethyl mucate and 8.5 parts of hexamethylenediammonium adipate are mixed thoroughly and placed in a tubular vessel with an open end. The vessel is flushed with nitrogen and sealed off at 2 mm. absolute pressure. The mixture is heated at 250° for two hours, then cooled and opened under nitrogen. It is heated at 278° at atmospheric pressure for one-half hour and at 278° for one-half hour under subatmospheric pressure. The interpolyamide of 75% of hexamethyleneadipamide and 25% of hexamethylenemucamide bis-cyclohexanone ketal thus obtained is a light-amber colored, tough solid, which can be spun and cold-drawn. It softens at 241–245° and has an intrinsic viscosity of 0.77. It is soluble in phenolic solvents and formic acid.

Example X

Barium methylenetartrate is prepared by hydrolyzing diethyl methylenetartrate with barium hydroxide. To the barium methylenetartrate is added an equivalent amount of hexamethylenediammonium sulfate and about five times the volume of water. The mixture is tumbled in a ball mill for two hours and the barium sulfate is filtered off. The aqueous solution is evaporated to dryness to give a quantitative yield of hexamethylenediammonium methylenetartrate, melting point 240°.

Eight parts of hexamethylenediammonium adipate and 2.84 parts of hexamethylenediammonium methylenetartrate are mixed thoroughly in a tubular vessel with an open end, the tube is flushed with nitrogen and sealed off at 2 mm. absolute pressure. After heating at 180° for 2 hours the tube is cooled and nitrogen is readmitted. It is then heated at 256° at atmospheric pressure for one-half hour to obtain a dark-brown interpolyamide comprising 75% hexamethyleneadipamide and 25% hexamethylenemethylenetartramide. This polymer softens at 221–227°, has an intrinsic viscosity of 0.85 and can be spun and cold-drawn.

Among the aldehydes and ketones which can be reacted with the dibasic acids containing two or more hydroxyl groups to obtain polyamide-forming reactants having lateral acetal bridges are formaldehyde, acetaldehyde, butyraldehyde, benzaldehyde, hexahydrobenzaldehyde, acetone, diethyl ketone, cyclopentanone, and acetophenone. Since the formation of each acetal bridge requires two hydroxyl groups, it is apparent that a reactant containing a lateral acetal bridge which is obtained from a compound containing at least three and an uneven number of hydroxyl groups would give a polyamide having both acetal bridges and hydroxyl groups.

Dibasic acids which when acetalized to form lateral acetal bridges form useful polyamide-forming reactants in this invention include compounds such as 1-tartaric and racemic tartaric acids, saccharic acid, manno-saccharic acid, ido-saccharic acid, talo-mucic acid, allo-mucic, 3,4-dihydroxyadipic acid, 8,9-dihydroxyhexadecanedioic acid, and 4,4'-dicarboxyhydrobenzoin. The alcohol or phenol esters of the ketal or acetal-bridged dibasic acids of the type of tartaric or mucic acid are particularly valuable. The above mentioned acids and their amide-forming derivatives can be reacted with various diamines such as tetramethylenediamine, pentamethylenediamine, hexamethylenediamine, octamethylenediamine, decamethylenediamine, meta-phenylenediamine, p-phenylenediamine, benzidine, 2-aminomethylcyclopentylamine, bis-(p-aminoethyl)benzene, and triglycoldiamine. The polyamides so formed are characterized by hydrolysis to hydroxyl-containing polyamides which in turn are further hydrolyzed to the corresponding hydroxy dibasic acid, diamine salt, and aldehyde.

Interpolyamides containing lateral acetal bridges may be obtained by replacing part of the acetal-bridged dibasic acid by other polyamide-forming reactants such as suberic acid, sebacic acid, p-phenylenediacetic acid, terephthalic acid, piperazinediacetic acid, or by adding an amino acid such as omega-aminocaproic acid or 12-aminostearic acid, or by using two or more diamines.

The higher molecular weight polyamides containing lateral acetal bridges can be used for the preparation of useful fibers and films. Thus a polyamide similar to that described in Example 2 may readily be spun and cold-drawn into fibers, while clear, transparent films are readily prepared by casting a methanol solution of the polyamide on a smooth surface and allowing the solvent to evaporate. Since the higher molecular weight polyamides containing lateral acetal bridges are in general clear, transparent resins, they can be used as plastic materials in the preparation of molded and extruded articles. The solutions of polyamides containing lateral acetal bridges in common organic solvents such as methanol or acetone can be used as coating compositions.

The present invention provides from readily available materials polyamides of increased solubility. This invention also provides a convenient method for easily obtaining fiber-forming polyamides from short-chain dibasic acids. The present polyamides are also to a high degree capable of chemical modification. Since the lateral acetal bridges of the polyamides are less stable to dilute mineral acids than the amide groups, they are hydrolyzed in preference to the amide groups with the formation of polyamides containing free hydroxyl groups. These hydroxyl-containing polyamides can be reacted with organic reagents such as acid chlorides, anhydrides, acyl alkyl ketenes and isocyanates which are known to be specific for hydroxyl groups.

As many apparently widely different embodiments of this invention may be made without departing from the spirit and scope thereof, it is to be understood that I do not limit myself to the specific embodiments thereof except as defined in the appended claims.

I claim:

1. A polyamide comprising the reaction product of a bifunctional diamine with a bifunctional compound which is selected from the group consisting of (a) dicarboxylic acids containing in the chain of atoms between the carboxyl groups a lateral acetal group bridging two contiguous carbon atoms, and (b) amide-forming derivatives of said dicarboxylic acids.

2. The polyamide set forth in claim 1 in which said dicarboxylic acid is tartaric acid.

3. A polyamide comprising the reaction product of a bifunctional diamine with a bifunctional ester obtained by esterifying tartaric acid with an alcohol, said acid containing a lateral acetal group bridging two contiguous carbon atoms.

4. A polyamide comprising the reaction product of a bifunctional diamine with a bifunctional ester obtained by esterifying tartaric acid with a phenol, said acid containing a lateral acetal group bridging two contiguous carbon atoms.

5. A polyamide comprising the reaction product of a bifunctional diamine with a bifunctional ester obtained by esterifying mucic acid with an alcohol, said acid containing a lateral acetal group bridging two contiguous carbon atoms.

6. A polyamide comprising the reaction product of a bifunctional diamine with a bifunctional ester obtained by esterifying mucic acid with a phenol, said acid containing a lateral acetal group bridging two contiguous carbon atoms.

7. A synthetic linear polyamide comprising the reaction product of a bifunctional diamine with a bifunctional compound which is selected from the group consisting of (a) dicarboxylic acids containing in the chain of atoms between the carboxyl groups a lateral acetal group bridging two contiguous carbon atoms, and (b) amide-forming derivatives of said dicarboxylic acids, said polyamide being capable of being formed into filaments which upon cold-drawing yield oriented fibers.

8. The polyamide set forth in claim 7 in which said dicarboxylic acid is tartaric acid.

9. A process for making polyamides which comprises reacting with heat treatment a bifunctional diamine with a bifunctional compound which is selected from the group consisting of (a) dicarboxylic acids containing in the chain of atoms between the carboxyl groups a lateral acetal group bridging two contiguous carbon atoms, and (b) amide-forming derivatives of said dicarboxylic acids.

10. The process set forth in claim 9 in which said dicarboxylic acid is tartaric acid.

11. The polyamide set forth in claim 1 in which said dicarboxylic acid is mucic acid.

12. The polyamide set forth in claim 7 in which said dicarboxylic acid is mucic acid.

13. The process set forth in claim 9 in which said dicarboxylic acid is mucic acid.

PAUL L. SALZBERG.